(12) United States Patent
Chifu et al.

(10) Patent No.: US 7,677,807 B2
(45) Date of Patent: Mar. 16, 2010

(54) HUB UNIT FOR WHEEL

(75) Inventors: Taketoshi Chifu, Kanagawa-ken (JP);
Tetsu Takehara, Kanagawa-ken (JP);
Tomoharu Sugiman, Kanagawa-ken (JP);
Kinji Yukawa, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 491 days.

(21) Appl. No.: 10/590,194

(22) PCT Filed: Mar. 3, 2005

(86) PCT No.: PCT/JP2005/004160
§ 371 (c)(1),
(2), (4) Date: Aug. 22, 2006

(87) PCT Pub. No.: WO2005/085665
PCT Pub. Date: Sep. 15, 2005

(65) Prior Publication Data
US 2007/0140611 A1    Jun. 21, 2007

(30) Foreign Application Priority Data
Mar. 3, 2004  (JP) ............................. 2004-059255
Mar. 12, 2004  (JP) ............................. 2004-071796

(51) Int. Cl.
*F16C 13/00*    (2006.01)
*F16C 19/08*    (2006.01)
(52) U.S. Cl. .................. 384/544; 384/547; 384/589
(58) Field of Classification Search ................. 384/448, 384/499, 37, 542–548, 584–585, 589, 537, 384/625; 29/894, 361, 894.362, 898.061, 29/898.062, 898.07, 898.09; 301/105.1
See application file for complete search history.

(56) References Cited

U.S. PATENT DOCUMENTS 4,893,960 A * 1/1990 Beier et al. ................... 403/24
5,226,738 A   7/1993 Valette et al.

(Continued)

FOREIGN PATENT DOCUMENTS

EP    849097 A2 *  6/1998

(Continued)

OTHER PUBLICATIONS

International Search Report dated Jun. 21, 2005 including English Translation of relevant portion (Four (4) pages).

(Continued)

*Primary Examiner*—Marcus Charles
(74) *Attorney, Agent, or Firm*—Crowell & Moring LLP

(57) ABSTRACT

A hub unit for wheel is described, with an outer ring having two bearing tracks on its inner circumferential surface, and a hub having a wheel mount flange on the outer end side and an end portion on the axially vehicle center side. The hub has a first bearing track corresponding to the axially vehicle outer end side bearing track of the outer ring, and an inner ring element fitted on the end portion side of the hub. The inner ring element has on its outer circumference a second bearing track opposed to the axially vehicle center side bearing track of the outer ring, and is fixed on the end portion by plastically deforming the end portion of the hub radially outwardly. Rolling members are provided between the two bearing tracks of the outer ring and the first and second bearing tracks.

14 Claims, 8 Drawing Sheets

U.S. PATENT DOCUMENTS

| | | | | |
|---|---|---|---|---|
| 5,822,859 | A | * | 10/1998 | Kessen et al. .......... 29/898.062 |
| 6,299,360 | B1 | * | 10/2001 | Dougherty et al. .......... 384/584 |
| 6,363,799 | B1 | * | 4/2002 | Toda et al. .............. 73/862.49 |
| 6,478,471 | B2 | * | 11/2002 | Ishida et al. ................. 384/537 |
| 6,532,666 | B1 | * | 3/2003 | Denny et al. ............. 29/898.06 |
| 6,648,518 | B2 | * | 11/2003 | Uchman ..................... 384/544 |
| 6,669,374 | B2 | * | 12/2003 | Miyazaki .................... 384/537 |
| 6,862,808 | B2 | * | 3/2005 | Miyazaki .................... 384/544 |
| 6,908,231 | B2 | * | 6/2005 | Hagiwara ................... 384/537 |
| 2003/0002761 | A1 | * | 1/2003 | Hagiwara ................... 384/544 |

FOREIGN PATENT DOCUMENTS

| | | | |
|---|---|---|---|
| EP | 1 270 268 | A2 | 1/2003 |
| JP | 2000-38005 | A | 2/2000 |
| JP | 2000-74079 | A | 3/2000 |
| JP | 2000-168306 | A | 6/2000 |
| JP | 2001-1710 | A | 1/2001 |
| JP | 2002139060 | A * | 5/2002 |
| JP | 2002-274118 | A | 9/2002 |
| JP | 2003-74571 | A | 3/2003 |
| JP | 2003-232377 | A | 8/2003 |
| JP | 2005-138653 | A | 6/2005 |
| JP | 2006-94039 | A | 4/2006 |

OTHER PUBLICATIONS

English translation of International Preliminary Report on Patentability dated Sep. 28, 2006, including PCT/ISA/237 (Written Opinion of the International Searching Authority) (six (6) pages).

Japanese Office Action dated Nov. 24, 2009 including English translation (Five (5) pages).

* cited by examiner

US 7,677,807 B2

HUB UNIT FOR WHEEL

TECHNICAL FIELD

The present invention relates to a hub unit for a vehicle. More particularly, the present invention relates to a hub unit for a vehicle in which an inner ring element fitted on the hub is fastened and fixed thereto by caulking the vehicle center side end portion of the hub.

BACKGROUND ART

In hub units in which an inner ring element is fixed by caulking the vehicle center side end portion of the hub, the end portion to be caulked is plastically deformed by a caulking tool in such a way as to extend radially outwardly, so that the inner ring element is fastened and fixed by the plastically deformed portion thus swaged. In this process there is a risk that the inner ring element and/or the hub may be deformed to cause a change in the dimension of a track on the inner ring element or a deformation of the shape of the track surface, which can lead to deterioration in the performance of the hub unit.

To avoid deformation of the inner ring element, there has been proposed a technique in which an annular constraining jig is attached on the radially outer portion of the inner ring to suppress deformation of the inner ring (see for example Japanese Patent Application Laid-Open No. 2000-38005).

However, the constraining jig proposed in Japanese Patent Application Laid-Open No. 2000-38005 necessitates an operation of inserting it between the inner ring element and an outer ring, and in addition, that operation needs to be performed every time for every hub unit for wheel. This takes time and effort and leads to a decrease in the work efficiency and an increase in production cost.

In the caulking process according to a prior art disclosed in U.S. Pat. No. 5,226,738, caulking operation is performed by gradually pressing a cylindrical portion to be caulked provided at the vehicle center side end of a hub using a metal mold for caulking. In the final step of the caulking operation just before completion, the metal mold strongly presses the end to be caulked of the hub in the axial direction, so that a force that tends to displace the hub radially outwardly toward the inner ring element is generated at the fitting portion of the inner ring element and the hub as a component force of the pressing force. Thus, the inner ring element receives a force in radially outward directions to deform. When such deformation is large, excessive pressure in the bearing and deformation of the track can occur, which can cause shortening of the life of the bearing, an increase in the torque or noise. In addition, there is the problem that the more securely the inner ring element and the hub are fixed together, the larger the deformation of the inner ring element toward radially outward directions will become.

An object of the present invention to minimize deformation of the inner ring element generated upon caulking as much as possible, and to provide a hub unit that does not suffer from deterioration in performance.

To achieve the above object, a hub unit for wheel according to a first aspect of the present invention comprises:

an outer ring having two bearing tracks on its inner circumferential surface;

a hub having a wheel mount flange on the axially vehicle outer end side and an end portion on the axially vehicle center side, the hub having, as a separate part or integrally on its outer circumference, a first bearing track corresponding to the axially vehicle outer end side bearing track of the outer ring;

an inner ring element fitted on the end portion side of the hub, the inner ring element having on its outer circumference a second bearing track opposed to the axially vehicle center side bearing track of the outer ring and being fixed on the end portion by plastically deforming the end portion of the hub radially outwardly; and rolling members provided between the two bearing tracks of the outer ring and the first and second bearing tracks, wherein the outer diameter of a plastically deforming portion of the end portion is made smaller than the diameter of the portion of the inner ring element that is fitted on the hub, the start point of the small diameter portion is arranged to be situated between the start point of a chamfered portion on the inner circumferential surface of the inner ring element and the vehicle center side end face of the inner ring element, and the end portion is plastically deformed radially outwardly to fasten and fix the inner ring element.

According to the hub unit for wheel according to the first aspect of the present invention, it is not necessary to use a constraining jig when effecting the plastically deforming process.

According to the first aspect of the present invention, it is possible to fasten and fix the inner ring element on the vehicle center side of the hub while minimizing deformation of the inner ring element as much as possible, and therefore shortening of the useful life of the bearing will not occur. In addition, the length over which the inner ring element is press-fitted on the end portion is shortened, whereby assembling is made easier.

To achieve the above object, a hub unit for wheel according to a second aspect of the present invention comprises:

an outer ring having two bearing tracks on its inner circumferential surface;

a hub having a wheel mount flange on the outer end side and an end portion on the axially vehicle center side, the hub having, as a separate part or integrally on its outer circumference, a first bearing track corresponding to the axially vehicle outer end side bearing track of the outer ring;

an inner ring element fitted on the end portion side of the hub, the inner ring element having on its outer circumference a second bearing track opposed to the axially vehicle center side bearing track of the outer ring and being fixed on the end portion by plastically deforming the end portion of the hub radially outwardly; and rolling members provided between the two bearing tracks of the outer ring and the first and second bearing tracks, wherein a continuous circumferential groove is provided on the inner circumferential surface of the inner ring element adjacent to a chamfered portion on the inner end portion of the inner circumferential surface.

By providing a continuous circumferential groove on the inner circumferential surface of the inner ring element adjacent to a chamfered portion of the inner ring element as per the above, when the portion to be caulked is strongly pressed in the axial direction by a metal mold in the final stage of the caulking process, a portion of the material of the hub expanding radially outwardly in the fitting portion of the inner ring element and the hub is evacuated into the circumferential groove of the inner ring element, whereby the expansion is prevented from affecting the inner ring element. As a result, it is possible to reduce the radially outward force acting on the inner ring element upon caulking and circumferential stress on the outer circumference of the inner ring element.

According to the second aspect of the present invention, not only the radially outward force acting on the inner ring element can be reduced by the above described effect, but the radially expanding material of the hub intrudes into the circumferential groove, whereby the intruding portion helps to prevent axial displacement of the inner ring element relative to the hub. In this way, it is possible to fix the inner ring element more strongly, and this is advantageous also in preventing pressure failure of the hub bearing apparatus for wheel and creeping that may occur at the fitting portion of the inner ring element on the hub.

Furthermore, in the second aspect of the present invention, since the main chamfered portion on the inner ring element is left unchanged, and the circumferential groove is formed on the inner circumferential surface of the inner ring element adjacent to the main chamfered portion, the circumferential groove is not open to the inner end face of the inner ring element. Therefore, from the early stage to the final stage of caulking, the amount of the material intruding into the groove is small, and the material of the hub including a cylindrical portion to be caulked gets into the groove when a strong axial force causes a radially outward strong force acting on the inner ring element in the final stage of caulking. Therefore, it is possible to relieve the effect of the aforementioned strong force. With such intrusion of the hub material into the circumferential groove, it is also possible to prevent axial displacement of the inner ring element relative to the hub. Furthermore, according to the second aspect of the present invention, troublesome machining such as knurling can be eliminated.

As per the above, in the hub unit for wheel according to the second aspect of the present invention, when the portion to be caulked is strongly pressed in the axial direction by a metal mold in the final stage of caulking, it is possible to evacuate the portion of the hub that expands radially outwardly, in the fitting portion of the inner ring element and the hub, into the circumferential groove provided on the inner circumferential surface of the inner ring element. Therefore it is possible to reduce the radially outward force acting on the inner ring element upon caulking and to reduce expansion and deformation of the inner ring element caused by caulking. Furthermore, it is possible to prevent axial displacement of the inner ring element relative to the hub and to prevent creeping or relative movement of inner ring element in the radial direction.

BRIEF DESCRIPTION OF THE DRAWINGS

FIG. 3A is an enlarged view of portion A in FIG. 2, FIG. 3B illustrates an intermediate stage of caulking, and FIG. 3C illustrates an intermediate stage of caulking.

FIG. 6A is a cross sectional view showing the entire structure of a hub bearing apparatus for a wheel, and FIG. 6B is an enlarged cross sectional view of a relevant part in FIG. 6A.

BEST MODE FOR CARRYING OUT THE INVENTION

In the following, a hub unit for a wheel according to an embodiment of the present invention will be described with reference to the drawings.

In this specification, the flange side of the hub unit for wheel, on which a wheel is mounted and which is normally oriented toward the exterior of the vehicle body in the state in which the hub unit for a wheel is mounted on the vehicle body, will be referred to as the outer side, and the opposite side oriented toward the center of the vehicle will be referred to as the inner side.

A first embodiment of the present invention will be described with reference to FIGS. 1 and 3A-3C.

Figure 1:
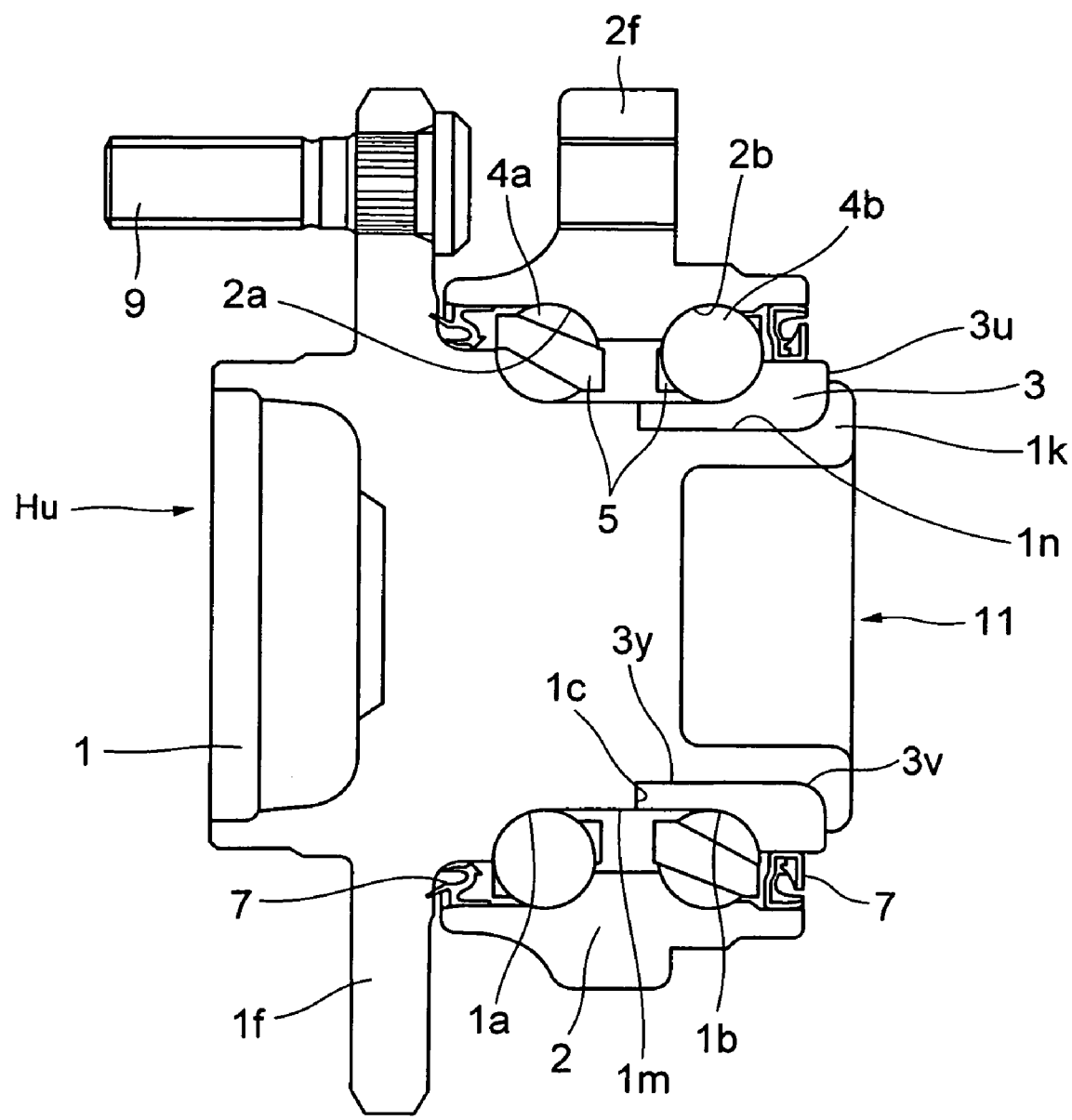
FIG. 1 is a cross sectional view showing a first embodiment of the present invention.

FIG. 1 is a cross sectional view of the hub unit for a wheel Hu according to the first embodiment.

In FIG. 1, a hub 1 is formed with a flange $1f$ for mounting a wheel (not shown) at its outer end side. A first bearing track $1a$ is directly provided on the flange side outer circumferential surface, which is a part of the outer circumferential surface $1m$ of the axially central portion.

The outer circumferential surface near the vehicle center side is formed as a first smaller diameter outer circumferential portion $1n$ that has a diameter smaller than the flange side outer circumferential surface and is connected to the flange side outer circumferential surface by a step portion $1c$. The vehicle center side end portion 11 (the right end in FIG. 1) of the first small diameter outer circumferential portion constitutes a deformed portion by caulking $1k$. As will be described later, the deformed portion by caulking $1k$ has a hardness near the hardness of a medium carbon steel that has not been subjected to heat treatment (HRC 15-28), which is preferable as a material for the hub 1, and therefore it can be deformed by caulking easily.

A separate inner ring element 3 is fitted on the first small diameter circumferential portion $1n$, and a second bearing track $1b$ is provided on the outer circumferential surface of the inner ring element 3. The inner ring element 3 is fastened by the deformed portion by caulking $1k$ on the vehicle center side of the hub 1 between the deformed portion by caulking $1k$ and the step portion $1c$, thereby fixed to the hub 1.

In this way, the inner ring element 3 is fastened and fixed on the hub 1 by the plastically deformed portion that is the deformed portion by caulking at one end of the hub 1. Thus, the first bearing track $1a$ formed directly on the hub and the second bearing track $1b$ constitutes two inner ring tracks.

The inner ring element 3 has a chamfered surface $3v$ with a single radius or composite radius formed between its vehicle center side end face $3u$ and the inner circumferential surface $3y$ of the inner ring element 3. Thus, the inner ring element 3 has a preferable shape that facilitates deforming by caulking of the end portion 11 of the hub 1.

The outer ring 2 has double-row bearing tracks $2a$, $2b$ corresponding to the first bearing track $1a$ and the second bearing track $1b$ of the hub 1. On the outer circumference of the outer ring 2 is integrally provided a flange $2f$ to be mounted on the vehicle body. Seal rings 7, 7 for sealing the spaces between the hub 1 and the outer ring 2 are attached on both end portions of the outer ring 2.

Rolling elements $4a$, $4b$ are present between the first and second bearing tracks $1a$, $1b$ and the bearing tracks $2a$, $2b$ of the outer ring to allow relative rotation of the hub 1 and the outer ring respectively. The rolling elements $4a$, $4b$ are retained by the retainers 5. Thus, a hub bearing is formed. A wheel (not shown) is mounted on the flange $1f$ by screw bolts 9.

Figure 2:
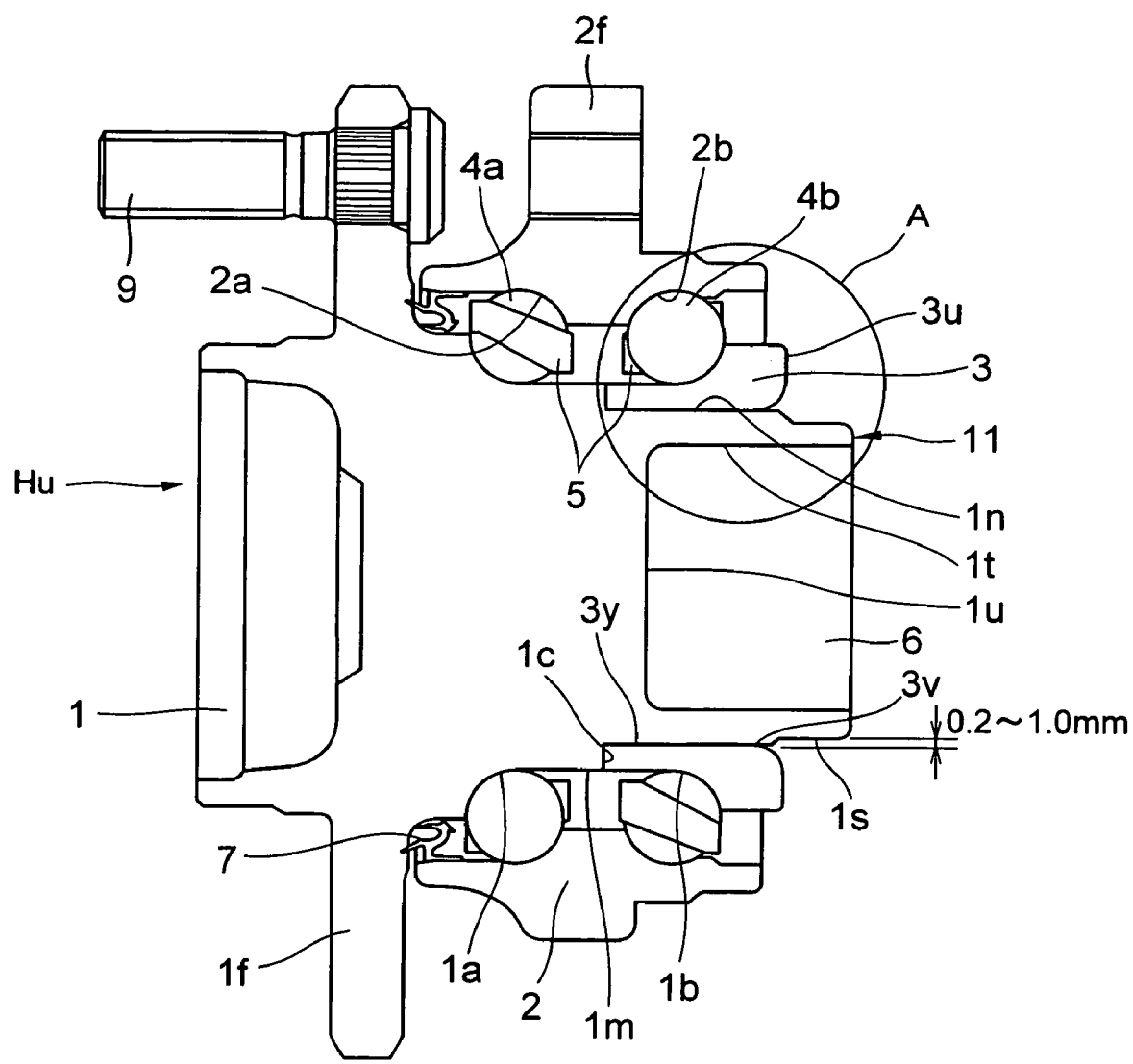
FIG. 2 is a cross sectional view showing the first embodiment before caulking of the hub.

FIG. 2 shows the hub 1 in the state in which the vehicle center side end portion 11 of hub 1 has not been deformed by caulking yet. In the state before deformed by caulking, the end portion 11 of the hub 1 has the first small diameter outer circumferential portion 1n on which the inner ring element 3 is fitted and a second small diameter outer circumferential portion is that is adjacent to the first small diameter outer circumferential portion in, has a radius 0.2-1.0 mm smaller than the first small diameter outer circumferential portion 1n and extends toward the vehicle center side. Inside the first and second small diameter outer circumferential portions 1n, 1s are formed a counterbore 6 having a inner circumferential surface 1t and a bottom 1u with a wall thickness suitable for caulking as will be described later.

A description will be made with reference to FIG. 3A, which is an enlarged view of portion A in FIG. 2.

The point 1p at which the second small diameter outer circumferential portion 1s adjacent to the first small diameter outer circumferential portion 1n of the hub 1 starts is located at a position whose distance from the reference point at the step portion 1c of the hub is smaller than the width B of the inner ring element 3 and larger than the length (B-R) of difference between the width B of the inner ring element 3 and the length R from the start point 3p of the inner surface of the chamfered portion to the end face 3u. With this positional relationship, the start point 1p of the second small diameter outer circumferential portion 1s is positioned between the start point 3p of the chamfered portion of the inner circumferential surface of the inner ring 3 and the vehicle center side end face 3u of the inner ring element 3.

Figure 3A:
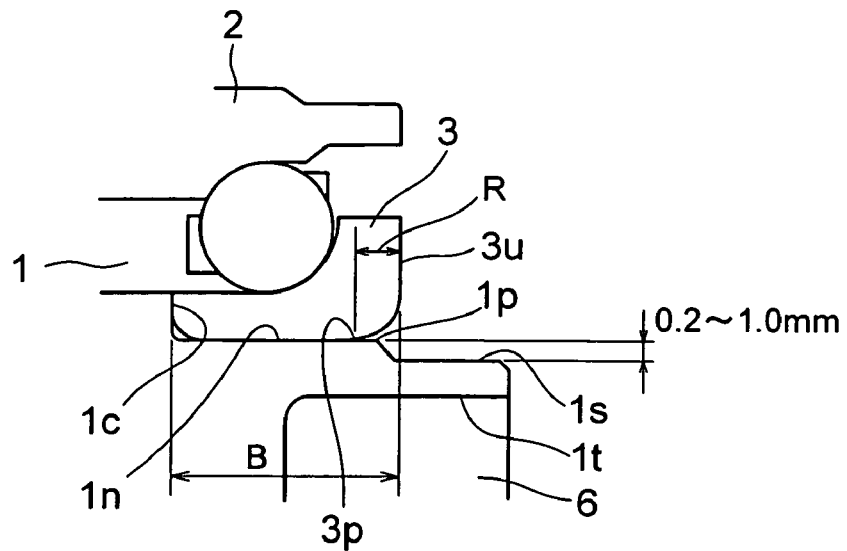
In FIGS. 3A to 3C illustrating caulking.

In FIGS. 2 and 3A, elements and portions other than those described above, which are common to FIG. 1, are only designated by reference characters, and descriptions thereof will be omitted.

Figure 3B:
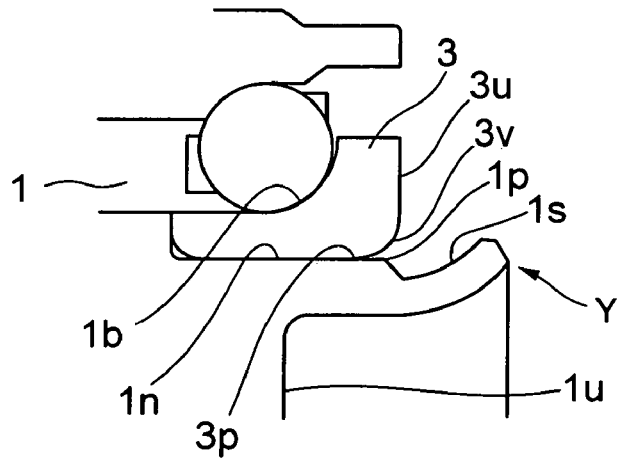
Figure 3C:
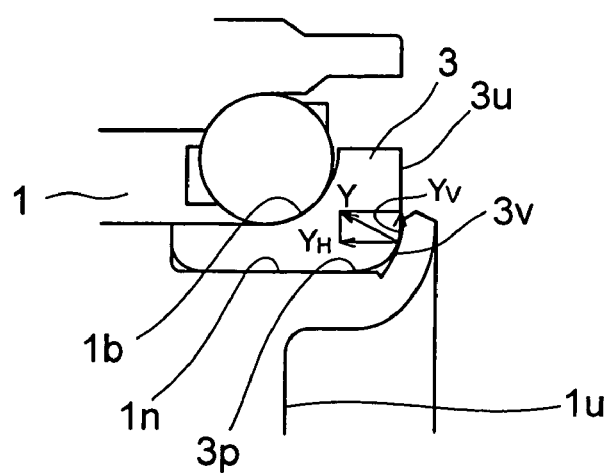

FIGS. 3B and 3C show states in which a force is applied on the second small diameter outer circumferential portion 1s of the end portion 11 shown in FIG. 3 by a caulking tool (not shown) in the direction indicated by arrow Y to expand it.

When a force is applied by the caulking tool in the direction of arrow Y, the second small diameter outer circumferential portion 1s of the hub 1 firstly starts to deform, since it is thinner than the first small diameter outer circumferential portion 1n.

Since the radius of the second small diameter outer circumferential portion 1s is smaller than the radius of the first small diameter outer circumferential portion 1n by 0.2 mm or more, when the expansion progresses and the second small diameter outer circumferential portion 1s comes in contact with the end face 3u of the inner ring element 3, the axial component $Y_H$ of the force for expanding the deformed portion by caulking in the Y direction becomes sufficiently larger than the radial component $Y_v$ thereof as shown in FIG. 3C, and therefore it is possible to fasten and fix the inner ring element 3 with respect to the axial direction for sure and to suppress radially deforming effects acting on the inner ring element 3.

It is not preferable that the second small diameter outer circumferential portion 1s has a radius smaller than the first small diameter outer circumferential portion 1n by more than 1.0 mm, since the required wall thickness of the deformed portion by caulking is not ensured.

When the expansion further progresses and the second small diameter outer circumferential portion 1s comes in contact with the end face 3u of the inner ring element 3, since the start point 1p of the second small diameter outer circumferential portion 1s at a position between the start point 3p of the chamfered portion and the end face 3u of the inner ring element 3, contact of the start point 1p with the chamfered portion 3v of the inner ring element 3 is delayed, and when it come in contact with the chamfered portion, the force deforming the inner ring element 3 has already become weak. Thus, deformation of the track 1b of the inner ring element 3 can be minimized.

In FIGS. 3B and 3C, elements and portions other than those described above, which are common to FIG. 3A, are only designated by reference characters, and descriptions thereof will be omitted.

A first modification of the first embodiment will be described with reference to FIG. 4.

Figure 4:
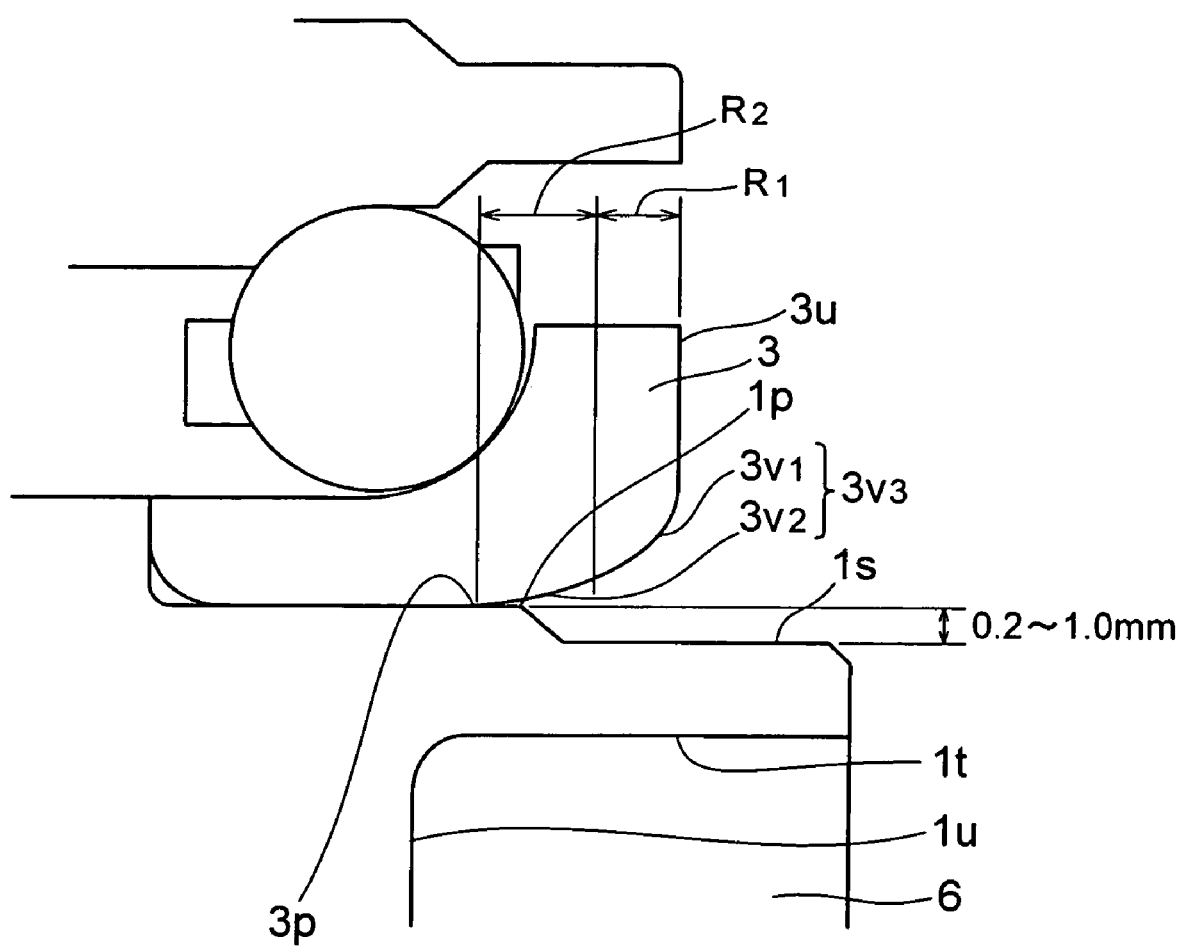
FIG. 4 is a cross sectional view of the upper half of a first modification of the first embodiment.

FIG. 4, which corresponds to FIG. 3A, shows a composite chamfered surface 3v3 composed of a chamfered portion 3v1 with a single radius dimension R1 of the inner ring element 3 and a chamfered portion 3v2 adjacent to the chamfered portion 3v1, which chamfered portion 3v2 has a circular arc cross section extending to the inner circumferential surface of the inner ring element 3 and has a chamfer dimension of R2.

The composite chamfered portion 3v3 has a chamfer dimension of R1+R2 toward the central portion of the inner ring element 3, which is larger than the chamfer dimension R shown in FIG. 3A. Therefore, the start point 3p of the chamfered portion of the inner ring element 3 can be further made closer to the central portion of the inner ring element 3, and when deformation is caused upon expanding the second small diameter outer circumferential portion 1s using a caulking tool in a manner similar to that shown in FIG. 3B, the time at which the start point 1p of the second small diameter outer circumferential portion 1s comes in contact with the chamfered portion 3v2 of the inner circumferential surface of the inner ring element 3 is further delayed, and deforming effect acting on the inner ring element 3 is further minimized.

In connection with the above, components and portions shown in FIG. 4 that are common to FIGS. 2 and 3A to 3C will be omitted.

Figure 5:
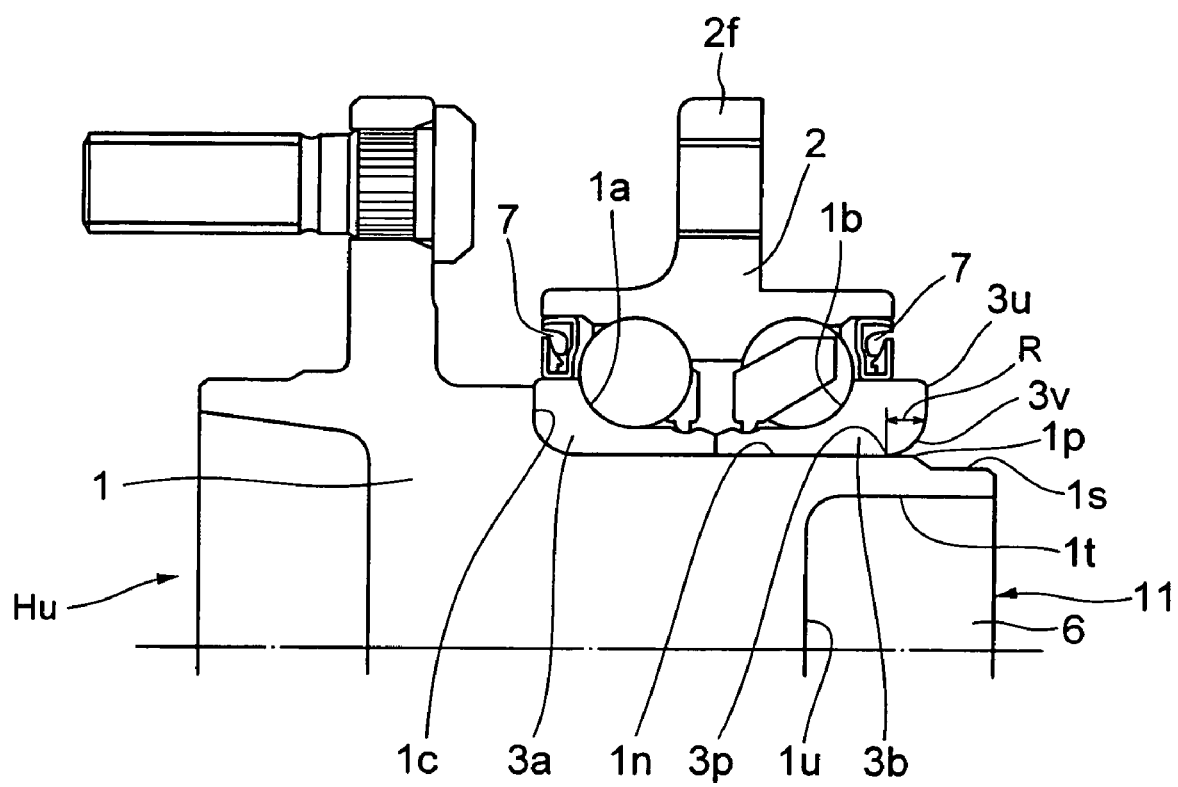
FIG. 5 is a cross sectional view of the upper half of a second modification of the first embodiment.

A second modification of the first embodiment will be described with reference to FIG. 5. FIG. 5 is a cross sectional view showing the upper half, above the center line, of a hub unit for a wheel.

The hub 1 according to the second modification is one in which the first bearing track 1a on the flange side is provided separately. The first bearing track 1a and the second bearing track 1b on the vehicle center side are formed respectively on two inner ring elements 3a, 3b, and the inner ring elements 3a and 3b are fitted on a first outer circumferential portion 1n. The end portion 11 of the hub 1 has a second small diameter outer circumferential portion 1s that is provided adjacent to the first outer circumferential portion 1n and has a radius smaller than the first small diameter outer circumferential portion 1n. The start point 1p of the second small diameter outer circumferential portion 1s in the positional range within the chamfer dimension R of the chamfer 3v of the inner circumferential surface from the position of the end face 3u of the vehicle center side inner ring element 3b.

In the end portion 11 of the hub 1 is formed a counterbore 6 having an inner circumferential surface it and a bottom 1u with a wall thickness suitable for caulking.

By caulking the end portion 11 in a manner similar to that shown in FIG. 3B, the inner ring element 3a and the inner ring element 3b are fixed between the step portion 1c of the hub 1 and the end portion 11. Descriptions of the components and portions that are common to FIG. 2 will be omitted.

According to the first embodiment, it is possible to fix the inner ring element(s) by caulking while minimizing deformation of the inner ring element at the vehicle center side end of the hub as much as possible, and therefore the life of the bearing is not shortened. In addition, the length over which the inner ring element is press-fitted on the end portion is shortened, whereby assembling is made easier.

Next, a second embodiment of the present invention will be described.

Figure 6A:
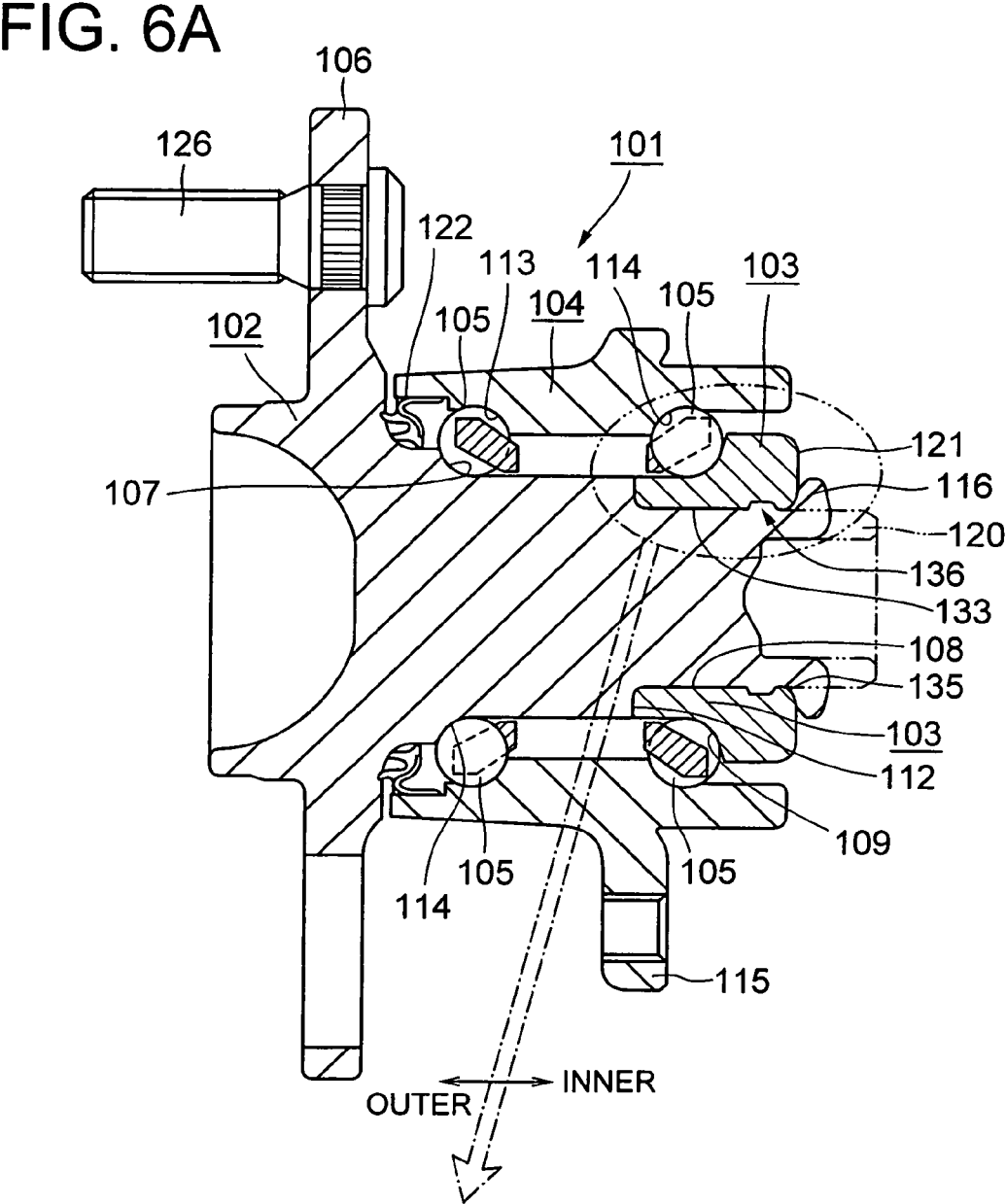
In FIGS. 6A and 6B showing a second embodiment of the present invention.
Figure 6B:
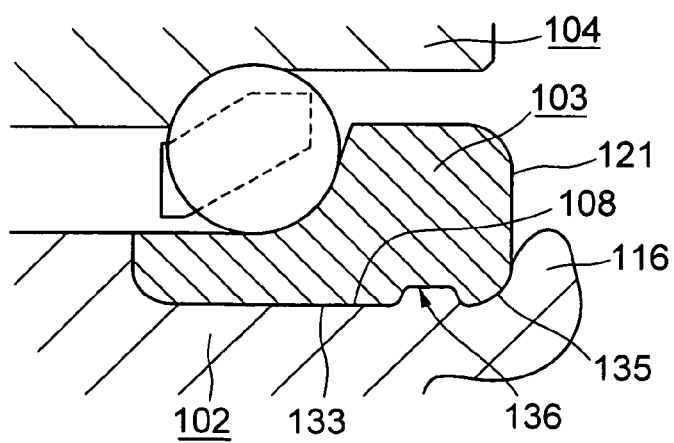

FIGS. 6A and 6B shows the second embodiment.

A hub bearing apparatus for wheel 101 is provided with a hub 102, an inner ring element 103 fitted to the hub 102, an outer ring 104 and a plurality of rolling elements 105, 105. The outer end portion of the outer circumferential surface of the hub 102 is provided with a flange 106 for supporting a wheel. The intermediate portion of the hub 102 has a first inner ring track 107, and the inner end portion thereof has a small diameter outer circumferential portion 108 having a reduced outer diameter.

An inner ring element 3 is press-fitted over the outer circumference of the small diameter outer circumferential portion 108 of the hub 102 so that the outer end face of the inner ring element 103 abuts the step face 112 of the hub 102, whereby two inner bearing tracks 107, 109 are formed. In the hub bearing apparatus according to this embodiment, one 107 of the double-row tracks on the hub is directly formed on the outer circumference of the hub 102, and the other track 109 is formed on the outer circumference of the inner ring element 103.

A cylindrical portion to be deformed by caulking that constitutes an end portion at the inner end of the hub 102 extending toward the inner side beyond the inner end face of the inner ring element 103 is bent radially outwardly to form a deformed portion by caulking 116. The inner ring element 103 is held between this deformed portion by caulking 116 and the step face 112 of the small diameter outer circumferential portion 108 so as to be fastened and fixed.

The inner circumferential surface of the outer ring 104 is provided with a first outer ring track 113 opposed to the first inner ring track 107 and a second outer ring track 114 opposed to the second inner ring track 109. A plurality of rolling elements 105, 105 are provided between the first inner ring track 107 and the first outer ring track 113 and between the second inner ring track 109 and the second outer ring track 114. In the illustrated case, the rolling elements 105, 105 are balls, but in the case of hub units for heavy vehicle, taper rollers may sometimes be used as the rolling elements.

When the above-described hub bearing apparatus for wheel 101 is mounted on a vehicle, the outer ring 104 is fixedly mounted on the suspension apparatus using an externally extending flange-like mount portion 115 provided on the outer circumferential surface of the outer ring 104, and a wheel is fixedly mounted on the flange 108. As a result, the wheel is rotatably supported on the suspension apparatus.

In the case of the first embodiment shown in FIG. 6A, as shown in an enlarged view of a relevant portion in FIG. 6B, a circumferential groove 136 is formed adjacent to the main chamfered portion 135 of the inner circumferential surface 133 of the inner ring element 103. The circumferential groove 136 is at least continuous on the inner circumferential surface 133, may be formed all along the circumference if necessary, and has a substantially trapezoidal cross sectional shape in the illustrated case.

In the above-described bearing apparatus for wheel 101, starting from the state in which the inner ring element 103 is fitted on the small diameter outer circumferential portion 108 of the hub 102 before caulking operation, the end portion 120 or the cylindrical portion to be deformed by caulking, which is fixedly provided on the inner side end of the hub 102 and extending beyond the inner ring element 103, is pressed in the axial direction by a swinging, rotating metal mold, as illustrated by two dot chain lines in FIG. 6A. In this process, the force exerted by the metal mold acts on the cylindrical portion to be deformed by caulking 120 principally in such a way as to bend the cylindrical portion to be deformed by caulking 120 radially outwardly, and this force partly presses the cylindrical portion to be deformed by caulking 120 in the axial direction. Thereafter, as the metal mold advances in the axial direction while swinging and rotating, the cylindrical portion to be deformed by caulking 120 is mainly pressed in the axial direction while being deformed in such a way as to be bent in the above-described manner, so that the portion to be deformed by caulking 120 having a shape that follows the shape defined by the swinging inner surface of the metal mold.

Figure 7:
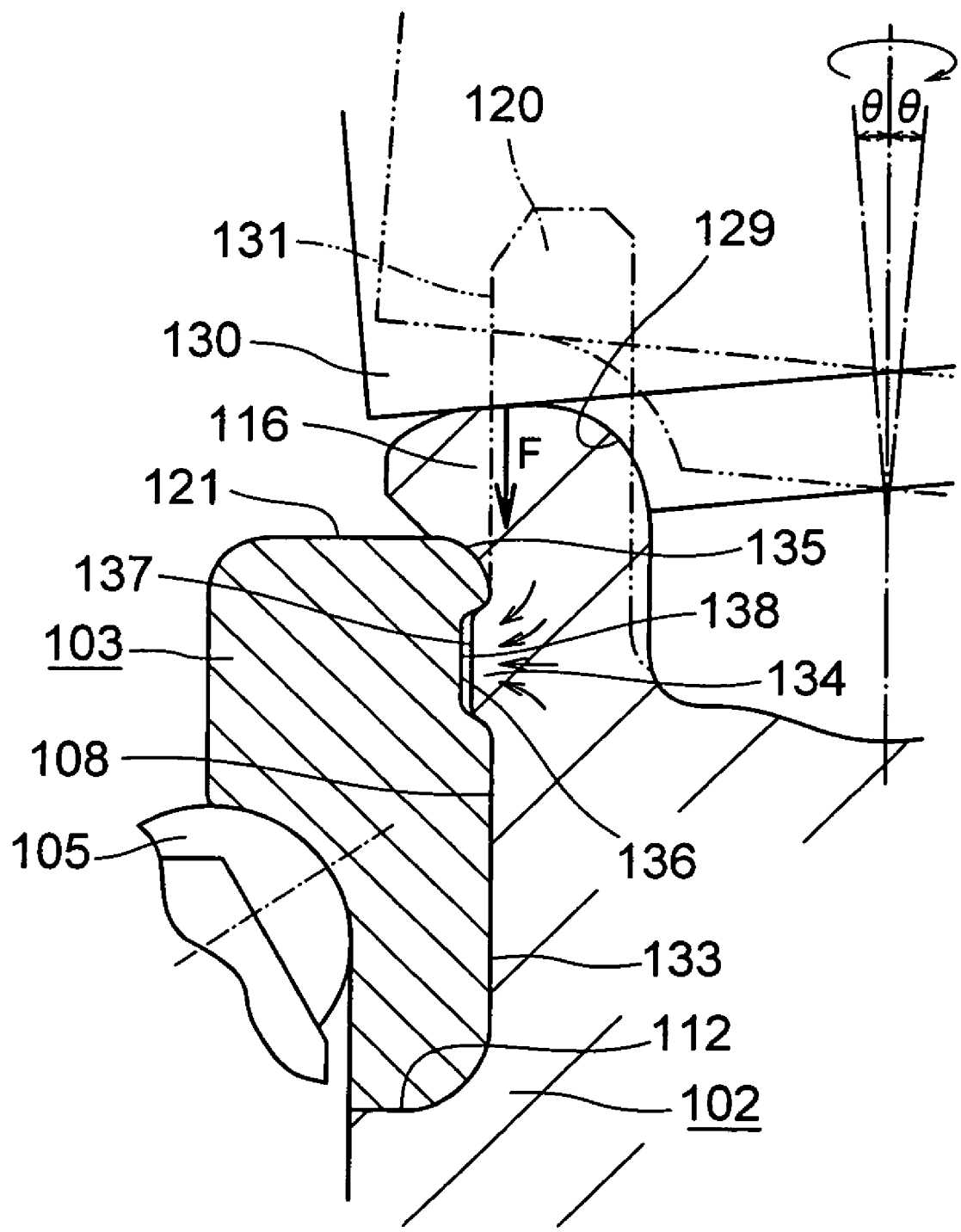
FIG. 7 is a cross sectional view of a relevant part for illustrating a function of a circumferential groove in caulking operation.

In the final stage of the caulking operation, as shown in FIG. 7, the mold surface 129 of the metal mold 130 strongly presses the swaged portion 116 with a predetermined force F, so that the inner ring element 103 is held between the step portion 112 of the hub 102 and the deformed portion by caulking 116 thereby being strongly fixed. In this process, the portion 134 opposed to the circumferential groove 136 shown in FIG. 7 in the base portion of the cylindrical portion to be deformed by caulking 120 of the hub 102 flows and expands radially outwardly into the circumferential groove 136 opposed thereto as movement of a part of the material of the hub 2 including the cylindrical portion to be deformed by caulking 120, as shown by arrows in FIG. 7.

With this expansion of the material, a protruding portion 134 is formed inside the circumferential groove 136. It is preferred that the outer circumferential surface 137 of the protruding portion 134 be prevented from reaching the inner circumferential bottom 138 as shown in FIG. 7. By letting the expansion of the material be absorbed by or evacuated into the circumferential groove 136, it is possible to relieve the radially outward force that acts on the inner ring element 103 directly, whereby it is possible to prevent radially expansive deformation of the inner ring element 103.

In the present invention, thanks to the above described expansion into the circumferential groove 136, it is possible not only to reduce the force that causes expansive deformation of the inner ring element 103 but also to fix the inner ring element 103 to the hub 102 more strongly. This is because when the radially expanding portion of the hub 102 intrudes into the circumferential groove 136, the intruding portion helps to prevent axial displacement of the inner ring element 103 relative to the hub 102 and in particular dislocation of the inner ring element 103 toward the right in FIG. 6A. This is also advantageous in preventing excessive pressure in the bearing apparatus for wheel and creeping that may occur at the fitting portion of the inner ring element 103 on the small diameter portion of the hub 102. In connection with the above, various experiments showed that it is preferred that the depth of the aforementioned circumferential groove 136 be in the range of about 0.5 to 3 mm, and its width (i.e. axial length) be in the range of about 1.0 to 8.0 mm, more preferably in the range of about 2.0 to 6.0 mm.

Figure 8A:
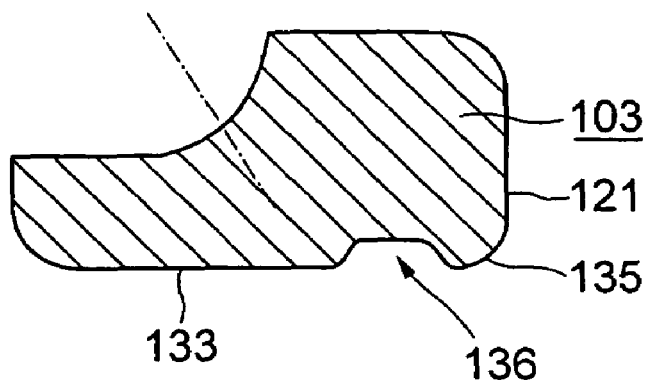
FIGS. 8A to 8D are cross sectional views showing various examples of the circumferential groove on an inner ring element in the second embodiment.
Figure 8B:
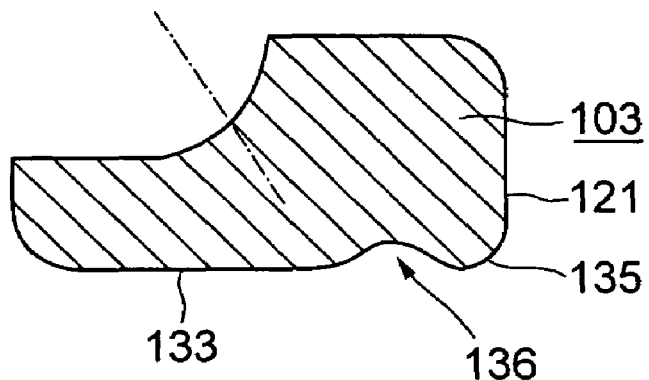
Figure 8C:
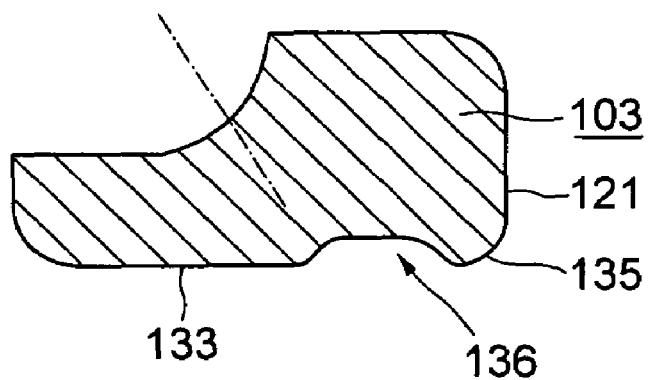

Although in the above-described case, the cross sectional shape of the circumferential groove 136 is a trapezoidal shape, the circumferential groove 136 may be implemented in further various modes. For example, referring to FIGS. 8A to 8D, which show only the cross sections of inner ring elements, a mode of the circumferential groove 136 having a substantially triangular cross section as shown in FIG. 8B, a mode of the circumferential groove 136 having a substantially elliptic cross section as shown in FIG. 8C and a mode of a circumferential groove 136 having an asymmetric, substantially triangular cross section as shown in FIG. 8D may also be adopted as well as the above described mode shown in FIG. 8A.

Figure 8D:
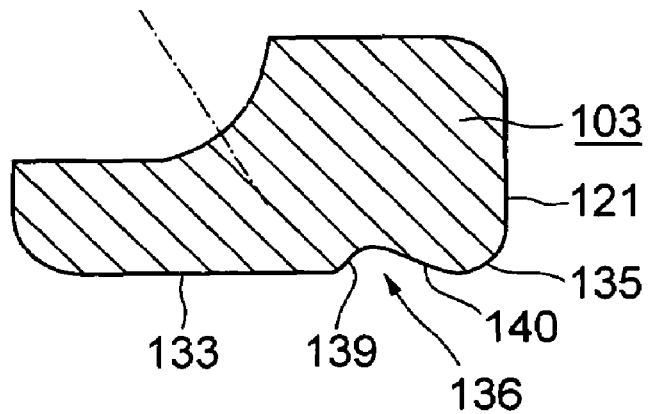

In these various modifications, especially in the mode with an asymmetric, substantially triangular cross section, as with the modification shown in FIG. 8D, by making the inclination of the outer side oblique surface 139 of the circumferential groove 136 steeper than the inner side oblique surface 140, it is possible to enhance the effect of preventing displacement of the inner ring element thanks to engagement of the outer side oblique surface 139 and the material of the hub 102 intruding into the circumferential groove 136 even when a strong force tending to dislocate the inner ring element 103 toward the inner side acts in the state in which the inner ring element 103 is fitted on the small diameter outer circumferential portion 108 of the hub 102 and fixed by deforming by caulking.

As exemplified by the above described cases, various cross sectional shapes may be adopted for the circumferential groove of the inner ring element, as long as they allow evacuation of radial expansion of the hub.

Although in the above described embodiments, cases in which the present invention is applied to bearing apparatus for hub using balls as rolling elements, similar advantageous effects of the present invention can be also achieved when it is applied to hub bearing apparatuses for wheel that use other rolling elements such as conical rollers, cylindrical rollers and barrel shaped rollers. Furthermore, although a driven wheel type has been described in the above embodiments by way of example, the present invention can also be applied to drive wheel type hub bearing apparatuses for wheel in which a shaft of a constant velocity joint is inserted into the hub.

The invention claimed is:

1. A hub unit for wheel comprising:
an outer ring having two bearing tracks on its inner circumferential surface;
a hub having a wheel mount flange on the outer end side and an end portion on the axially vehicle center side, said hub having, one of integrally and as a separate part on its outer circumference, a first bearing track corresponding to the axially vehicle outer end side bearing track of said outer ring;
an inner ring element fitted on said end portion side of said hub, said inner ring element having on its outer circumference a second bearing track opposed to the axially vehicle center side bearing track of said outer ring and being fixed on said end portion by plastically deforming said end portion of said hub radially outwardly by caulking, said inner ring element being formed with a chamfered portion between an inner circumferential surface and a vehicle center side end face; and
rolling members provided between the two bearing tracks of said outer ring and said first and second bearing tracks,
wherein said end portion of the hub is formed integrally with a first smaller diameter circumferential portion continuously to a portion of the second bearing track having a circumferential diameter smaller than that of the second bearing track and said inner ring element being fitted on the first smaller diameter circumferential portion; and
in a state before plastically deformed by caulking, said end portion of the hub being further formed with a second smaller diameter peripheral portion that is continuous to the first smaller diameter circumferential portion and has a smaller diameter than that of the first smaller diameter circumferential portion, and the start point of the second smaller diameter circumferential portion is located at a position whose distance from a boundary between the first bearing track and the second bearing track is smaller than the width of the inner ring element and larger than the length of difference between the width of the inner ring element and the length from the start point of the inner surface of the chamfered portion to said vehicle center side end face of the inner ring element.

2. A hub unit for wheel according to claim 1, wherein said second smaller diameter peripheral portion has a radius between 0.2 mm-1.00 mm smaller than that of said portion of said inner ring element that is fitted on the first smaller diameter peripheral portion of the hub.

3. A hub unit for wheel according to claim 1, wherein said second smaller diameter peripheral portion of said hub has a hardness HRC 15-28.

4. A hub unit for wheel comprising:
an outer ring having two bearing tracks on its inner circumferential surface;
a hub having a wheel mount flange on the outer end side and an end portion on the axially vehicle center side, said hub having, integrally on its outer circumference, a first bearing track corresponding to the axially vehicle outer end side bearing track of said outer ring;
an inner ring element fitted on said end portion side of said hub, said inner ring element having on its outer circumference a second bearing track opposed to the axially vehicle center side bearing track of said outer ring and being fixed on said end portion by plastically deforming said end portion of said hub radially outwardly by caulking, said inner ring element being formed with a chamfered portion between an inner circumferential surface and a vehicle center side end face; and
rolling members provided between the two bearing tracks of said outer ring and said first and second bearing tracks,
wherein said end portion of the hub is formed integrally with a first smaller diameter circumferential portion continuously to a portion of the second bearing track through a step portion therebetween, a circumferential diameter of the first smaller diameter circumferential portion is smaller than that of the second bearing track and said inner ring element being fitted on the first smaller diameter circumferential portion;
in a state before plastically deformed by caulking, said end portion of the hub being further formed with a second smaller diameter peripheral portion that is continuous to the first smaller diameter circumferential portion and has a smaller diameter than that of the first smaller diameter circumferential portion, and
the start point of the second smaller diameter circumferential portion is located at a position whose distance from said step portion of the hub is smaller than the width of the inner ring element and larger than the length of difference between the width of the inner ring element and the length from the start point of the inner surface of the chamfered portion to said vehicle center side end face of the inner ring element.

5. A hub unit for wheel according to claim 4, wherein said second smaller diameter peripheral portion to be plastically deformed of inner ring element has a radius between 0.2 mm-1.00 mm smaller than that of said portion of said inner ring element that is fitted on the first smaller diameter peripheral portion of the hub.

6. A hub unit for wheel according to claim 4, wherein said second smaller diameter peripheral portion of said hub has a hardness HRC 15-28.

7. A hub unit for wheel comprising:
an outer ring having two bearing tracks on its inner circumferential surface;
a hub having a wheel mount flange on the outer end side and an end portion on the axially vehicle center side, said hub having, as a separate part or integrally on its outer circumference, a first bearing track corresponding to the axially vehicle outer end side bearing track of said outer ring;
an inner ring element fitted on said end portion side of said hub, said inner ring element having on its outer circumference a second bearing track opposed to the axially vehicle center side bearing track of said outer ring and being fixed on said end portion by plastically deforming said end portion of said hub radially outwardly by caulking; and
rolling members provided between the two bearing tracks of said outer ring and said first and second bearing tracks,
wherein a continuous circumferential groove is provided on the inner circumferential surface of said inner ring element at an axially more vehicle center side than the second bearing track; and
a portion of the hub end portion on which the inner ring element is fitted, is expanded inside the continuous circumferential groove of said inner ring element by material forming the hub end portion having been flown and expanding therein.

8. A hub unit for wheel according to claim 7, wherein said expanded portion is protruded in the continuous circumferential groove of the hub end portion.

9. A hub unit for wheel according to claim 8, wherein the continuous circumferential groove of the hub end portion has a depth in the range of about 0.5 to 3 mm and a width in the axial direction in the range of about 1.0 to 8.0 mm.

10. A hub unit for wheel according to claim 8, wherein the continuous circumferential groove of the hub end portion has a depth in the range of about 0.5 to 3 mm and a width in the axial direction in the range of about 2.0 to 6.0 mm.

11. A hub unit for wheel according to claim 8, wherein the continuous circumferential groove of the hub end portion has an asymmetric, substantially triangular cross section, a vehicle outer side oblique surface of the triangular cross section being steeper than a vehicle inner side oblique surface of the same cross section.

12. A hub unit for wheel according to claim 7, wherein the continuous circumferential groove of the hub end portion has a depth in the range of about 0.5 to 3 mm and a width in the axial direction in the range of about 1.0 to 8.0 mm.

13. A hub unit for wheel according to claim 7, wherein the continuous circumferential groove of the hub end portion has a depth in the range of about 0.5 to 3 mm and a width in the axial direction in the range of about 2.0 to 6.0 mm.

14. A hub unit for wheel according to claim 7, wherein the continuous circumferential groove of the hub end portion has an asymmetric, substantially triangular cross section, a vehicle outer side oblique surface of the triangular cross section being steeper than a vehicle inner side oblique surface of the same cross section.

* * * * *